(12) United States Patent
Enders et al.

(10) Patent No.: US 7,424,326 B2
(45) Date of Patent: Sep. 9, 2008

(54) METHOD AND COMPUTER PROGRAM FOR MODELING AN INTERFERING PULSE IN A VEHICLE ELECTRIC SYSTEM

(75) Inventors: Thorsten Enders, Illingen (DE); Frank Stiegler, Ludwigsburg (DE); Klaus Dostert, Krickenbach (DE); Thorsten Huck, Elchesheim-Illingen (DE)

(73) Assignee: Robert Bosch GmbH, Stuttgart (DE)

( * ) Notice: Subject to any disclaimer, the term of this patent is extended or adjusted under 35 U.S.C. 154(b) by 982 days.

(21) Appl. No.: 10/932,798

(22) Filed: Sep. 2, 2004

(65) Prior Publication Data

US 2005/0107926 A1 May 19, 2005

(30) Foreign Application Priority Data

Sep. 6, 2003 (DE) ................. 103 41 191

(51) Int. Cl.
*G06F 7/00* (2006.01)
(52) U.S. Cl. ............... 700/1; 701/29; 701/32; 701/33; 701/34; 701/36; 701/37; 701/39; 180/197; 307/9.1; 702/183; 706/15
(58) Field of Classification Search ........ 701/1, 701/29, 32, 33, 34, 36, 37, 39; 180/197; 307/9.1; 702/183; 706/15
See application file for complete search history.

(56) References Cited

U.S. PATENT DOCUMENTS

| 7,089,099 | B2* | 8/2006 | Shostak et al. ............... 701/32 |
| 7,103,460 | B1* | 9/2006 | Breed ........................ 701/29 |
| 7,313,467 | B2* | 12/2007 | Breed et al. ................. 701/1 |
| 2005/0192727 | A1* | 9/2005 | Shostak et al. .............. 701/37 |
| 2006/0025897 | A1* | 2/2006 | Shostak et al. .............. 701/1 |
| 2006/0212194 | A1* | 9/2006 | Breed ........................ 701/29 |
| 2006/0284839 | A1* | 12/2006 | Breed et al. ................. 345/156 |

FOREIGN PATENT DOCUMENTS

| DE | 10301525 | 7/2004 |
| DE | 103 04 604 | 8/2004 |

* cited by examiner

*Primary Examiner*—Khoi H. Tran
*Assistant Examiner*—McDieunel Marc
(74) *Attorney, Agent, or Firm*—Kenyon & Kenyon LLP (57) ABSTRACT

A method and a computer program for modeling an interfering pulse in a vehicle electric system are described. Previous approaches for synthesizing such interfering pulses have proven to be insufficiently realistic for the simulation of certain application cases. An interfering pulse is therefore modeled by random determination of the parameters of the parameter set representing the interfering pulse to be modeled on the basis of the density functions belonging to the parameters and by substituting the parameters thus obtained into a predetermined mathematical function. The interfering pulse modeled in this way is also a suitable starting point for modeling a pulse pattern, i.e., a random sequence of individually spaced interfering pulses and a pulse interferer scenario, i.e., a random sequence of individually spaced pulse patterns.

17 Claims, 8 Drawing Sheets

METHOD AND COMPUTER PROGRAM FOR MODELING AN INTERFERING PULSE IN A VEHICLE ELECTRIC SYSTEM

FIELD OF THE INVENTION

The present invention relates to a method and a computer program for modeling an interfering pulse in a vehicle electric system which is used for supplying power to various components of the motor vehicle and for transmitting data among the components. During operation, at least individual components generate an interfering pulse in the vehicle electric system.

BACKGROUND INFORMATION

Only ISO test pulses according to a DIN standard are currently available for representing conducted interfering pulses in a vehicle electric system. However, these may be far from adequate for describing interference in a vehicle electric system. Furthermore, the influence of the vehicle electric system structure on the appearance of the pulses is completely disregarded. In the past there have therefore been various approaches for closing these gaps.

German patent application document no. 103 04 604.6 (not published previously) discusses and describes a method and a device for simulating interference in a vehicle electric system. This patent application proposes generating interfering pulses to be applied to a vehicle electric system, these interfering pulses not being simply a simulation of interfering pulses that actually occur in order to simulate interference in the vehicle electric system as realistically as possible. Instead, the generated interfering pulses are randomly generated and are subject to a statistical distribution by which they are also mathematically describable. The distribution function of the generated interfering pulses is determined on the basis of the probability distribution of actually occurring interfering pulses. This patent application is referred to below as "original application 1."

In addition, German patent application document no. 103 01 525.6 (also not published previously) discusses and describes a method and a computer device for synthesizing a pulse interferer in a vehicle electric system. This method includes the following method steps: empirically determining at least one possible interfering pulse of the pulse interferer; describing the empirically determined interfering pulse by a mathematical equation; determining the shape of an envelope curve of this empirically determined interfering pulse; and determining a time-dependent frequency vector of the interfering pulse. This patent application is referred to below as "original application 2."

However, the method for synthesizing conducted interfering pulses described in original application 2 may have the disadvantage that although this method is suitable for synthesis of individual pulse interferers, it may not be suitable for modeling a pulse interferer scenario including a plurality of individual pulse interferer patterns or interfering pulses spaced at intervals.

SUMMARY OF THE INVENTION

Based on the original application 2, an object of the exemplary embodiment and/or exemplary method of the present invention is therefore to provide a method and a computer program for modeling an interfering pulse in a vehicle electric system and a data medium having such a computer program which permit modeling of an interfering pulse in a vehicle electric system in such a manner that the interfering pulse modeled in this way may also be used subsequently for modeling a pulse interferer scenario in a vehicle electric system.

This object may be achieved by the exemplary methods described herein. Accordingly, the method for modeling an interfering pulse in a vehicle electric system described in the introduction has the following steps:

Empirically determining a plurality of interfering pulses; simulating the individual previously determined interfering pulses via a suitable mathematical function, in each case with a suitable parameter set, each parameter set containing a plurality of different parameters; transforming individual parameters in all parameter sets into a value range suitable for modeling; determining the density function for each transformed and non-transformed parameter on the basis of the plurality of its implementations contained in the parameter sets; and modeling the interfering pulse by random determination of the parameters of a parameter set which represents the interfering pulse to be modeled based on the density function belonging to the parameters and by substituting the parameters thus obtained into the mathematical function.

In contrast to the synthetic pulse interferer known from original application 2, an interfering pulse modeled in this way offers a usable basis for subsequent modeling of a pulse interferer pattern and a pulse interferer scenario. A pulse interferer pattern usually includes a plurality of individual interfering pulses with individually variable intervals between them. However, a pulse interferer scenario includes a plurality of pulse interferer patterns having individually variable intervals.

The interfering pulse modeled in this way advantageously also permits simulation of its effects on the possible communication among individual electrically operated components of the motor vehicle via the vehicle electric system. A developer using the exemplary method of the present invention as described herein will have an important tool for evaluating systems, i.e., components of the vehicle and the electric system connecting them, even in the design phase. As a result of the claimed method and the consequently possible simulation, such a system may be examined with respect to predefined requirements and optimized, if necessary, at a very early point in time without necessitating construction of a prototype or testing using the constructed prototype. This is a valuable time-saving tool, which is made possible through realistic simulation of an interfering pulse in a vehicle electric system implemented by the claimed method. Thus even a software-based design may be used to evaluate a planned system.

Advantageous embodiments of this method including a refinement of the method for modeling a pulse interferer pattern and a pulse interferer scenario are the object of the other exemplary embodiments and/or exemplary methods described herein.

The above-discussed object is also achieved by a computer program for implementing this method and by a data medium having this computer program. The advantages of these embodiments correspond to the advantages achieved above with respect to the exemplary methods described herein.

DETAILED DESCRIPTION

The exemplary embodiment and/or exemplary method of the present invention is described in detail below in the form of various exemplary embodiments with reference to the aforementioned figures.

The exemplary embodiment and/or exemplary method of the present invention relates to a method for modeling an interfering pulse in a vehicle electric system, which is used to supply power to various components and/or for transmission of data between the components. The interfering pulses to be modeled are generated in an unwanted manner by at least individual components during operation.

For modeling an interfering pulse, the exemplary method according to the present invention therefore first proposes empirical determination of a plurality of interfering pulses in a vehicle electric system. This means that the interfering pulses actually occurring in a real vehicle electric system are measured there.

The individual interfering pulses actually measured in this way are subsequently simulated by describing them mathematically as well as possible. This mathematical description includes two steps, namely selecting a suitable mathematical function and finally determining a suitable parameter set for this mathematical function so that the mathematical function together with the suitable parameter set reflect as optimally as possible one of the interfering pulses actually measured previously. The thus generated simulations of the originally measured interfering pulses are subsequently also referred to as approximating interfering pulses represented by their particular approximating parameter sets.

For a single originally measured interfering pulse, the method advantageously does not propose only a single approximation but instead provides for a plurality of approximations. Each approximating parameter set contains essentially the same parameters, e.g., the amplitude or frequency, but these individual parameters usually have different values in the individual approximations, although they represent the same measured interfering pulse. The size of the cross-correlation coefficient could be used as a first decision criterion for the choice of the parameter set most suitable to simulating the measured interfering pulse, i.e., the approximating interfering pulse. In concrete terms, this would mean that the approximating parameter set, i.e., the approximating interfering pulse, for which the particular cross-correlation coefficient is greatest, would be selected as being most suitable for simulation, i.e., approximation. As another criterion for evaluating the quality of the approximating interfering pulses, the method of zero error control may be used, as explained below.

For the further procedure, transformation of at least individual parameters in all parameter sets into a value range suitable for modeling is then recommended.

The density function for each transformed and non-transformed parameter set is then formed on the basis of the plurality of its implementations contained in the parameter sets and finally the sought interfering pulse to be modeled according to the exemplary embodiment and/or exemplary method of the present invention is determined from the plurality of available approximating interfering pulses by random determination of the parameters, i.e., implementation of a parameter set representing it on the basis of its particular density function, and by substituting the parameters thus obtained into the mathematical function.

The individual steps just described for implementing the method are explained in detail below with reference to the figures mentioned above.

Suitable Mathematical Function

For modeling an interfering pulse suitable for subsequent modeling of a pulse pattern or pulse scenario, one of the two following mathematical functions (model equations) is advantageously used:

$$y_{LS}(t)=(A_1 \cdot \exp(-c_1|t-t_1|)+A_2 \cdot \exp(-c_2|t-t_2|)) \cdot \sin(2\pi \cdot f(t) \cdot t) \quad (1)$$

and $$Y_{Poly}(t)=(a_8 t^8+a_7 t^7+a_6 t^6+a_5 t^5+a_4 t^4+a_3 t^3+a_2 t^2+a_1 t+a_0) \cdot \sin(2\pi \cdot f(t) \cdot t) \quad (2)$$

Parameters $A_1$, $A_2$, $c_1$, $c_2$, $t_1$, $t_2$ and time-dependent frequency vector $f(t)$ must thus be determined in first model equation (1). Coefficients $a_0$ through $a_8$ of the used polynomial and likewise time-dependent frequency vector $f(t)$ are needed for second model equation (2).

In the two equations (1) and (2), the terms in parentheses between the equality signs and the sine operator each represent an envelope curve equation. These envelope curve equations permit effective adjusting to the actual envelope curve of a measured pulse, so that possible distortion in the channel may be better taken into account.

Envelope Curve Approximation

Regardless of which of the two equations given above is used, it is advisable to suppress the noise component of the fundamental measurements, i.e., the already empirically determined measured values prior to approximating the envelope curve, which may be done using a Butterworth low-pass filter. The cutoff frequency of the low-pass filter may be kept variable and is determined from the estimated signal frequency. The quality of the estimated time-independent signal frequency is not expected to be particularly high, but it meets the requirements in the remaining course, in particular also because of the minimal time involved. For the envelope curve approximation, all points of intersection of a low-pass-filtered interfering pulse with the t axis are first identified below. The identified t values are subsequently used as interval limits. Another assumption for analysis of the relevant extreme positions of the interfering pulse is then formulated as follows: in each interval, i.e., between two zero crossings of the interfering pulse, there is exactly one relevant extreme position for determining the envelope curve. This extreme position is determined easily by determining the absolute maximum of the absolute value of the measurement recorded within the interval in question. If the extreme positions are connected by straight line segments in the sense of a linear interpolation, for example, this yields a very accurate approximation of the true envelope curve as it is shown by way of example in FIG. 1.

Figure 1:
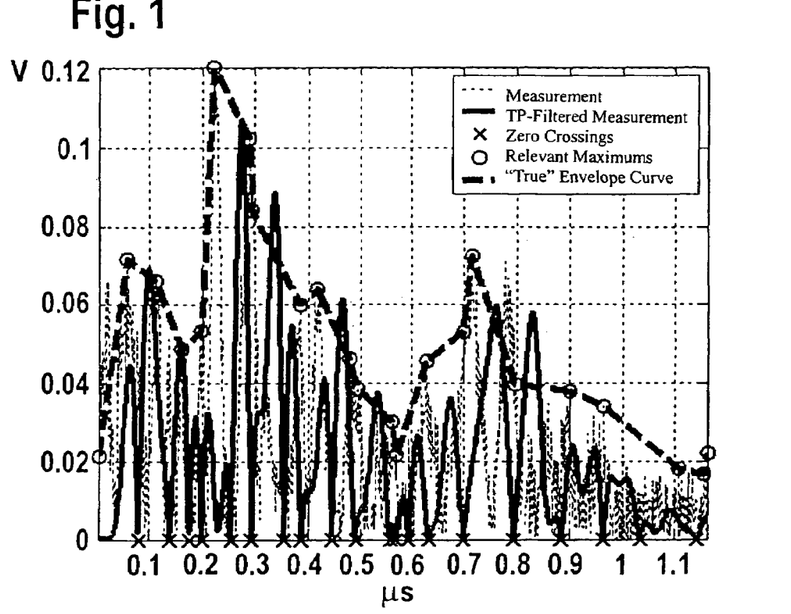
FIG. 1 shows a diagram for determining the envelope curve of an empirically determined interfering pulse.

Since the envelope curve determined in this way and composed of composite segments of straight lines does not conform to any mathematical function, the following methods are used.

When using the polynomial formula (see equation (2)) for simulating the interfering pulse, the available method for polynomial interpolation is basically recommended.

When using the above equation (1), however, the likewise essentially available method of least squares estimate is recommended, although with a slight modification. The modification is to divide the interfering pulse to be analyzed into a plurality of individual adjacent interfering pulses which, when superimposed, again represent the original interfering pulse. Since two adjacent pulses are then also superimposed in this division, they also mutually influence one another in the maximum amplitude. It is thus easy to see that a decaying main peak also makes a contribution to the amplitude of a neighboring peak. Therefore a first rough estimate of the main peak is performed and then used to uncouple the main peak and its neighboring secondary peak. This approximation is then subtracted from an approximating parameter data record and is thus used to approximate the secondary peak. The main peak is then approximated again to permit the most accurate possible approximation of it.

$$y_{envelope\ curve}^{1 \cdot rough}(n) = \left| \frac{1}{A_1} \cdot y_{envelope\ curve}(n) \right| = \exp(-c_1 \cdot |nT - n_1 T|) \tag{3}$$

$$\ln\left| y_{envelope\ curve}^{1 \cdot rough}(n) \right| = \ln(\exp(-c_1 \cdot |nT - n_1 T|)) = -c_1 \cdot |nT - n_1 T| \tag{4}$$

$$\underline{h}(n) = \begin{bmatrix} \ln\left| y_{envelope\ curve}^{1 \cdot rough}(0T) \right| \\ \ln\left| y_{envelope\ curve}^{1 \cdot rough}(1T) \right| \\ \vdots \\ \ln\left| y_{envelope\ curve}^{1 \cdot grob}((N-1)T) \right| \end{bmatrix} = \begin{bmatrix} |0T - n_1 T| \\ |1T - n_1 T| \\ \vdots \\ |(N-1)T - n_1 T| \end{bmatrix} \cdot (-c_1) = \underline{\psi}(n) \cdot (-c_1) \tag{5}$$

$$c_1 = -(\underline{\psi}^T(n) \cdot \underline{\psi}(n))^{-1} \cdot \underline{\psi}(n) \cdot \underline{h}(n) \tag{6}$$

After the main peak has been roughly approximated, the secondary peak is then first approximated by eliminating the main peak from the total envelope curve using the rough approximation. Next the secondary peak is removed from the envelope curve and the main peak is adjusted precisely.

$$y_{envelope\ curve}^2(n) = \left| \frac{1}{A_2} \cdot \left( y_{envelope\ curve}(n) - y_{envelope\ curve}^{rough}(n) \right) \right| \tag{7}$$

$$y_{envelope\ curve}^1(n) = \left| \frac{1}{A_1} \cdot \left( y_{envelope\ curve}(n) - y_{envelope\ curve}^2(n) \right) \right| \tag{8}$$

The parameters of the envelope curve are then calculated in equations (7) and (8) using the least squares estimation method, i.e., in particular parameters $A_1$, $A_2$, $c_1$ and $c_2$ are calculated. Parameters $c_1$ and $c_2$ are calculated analogously to the rough approximation of the main peak.

After both the main peak and the secondary peak have been approximated individually, the true composite envelope curve is obtained according to the following equation (9) by additive superimposition:

$$y_{envelope\ curve}(n) = y_{envelope\ curve}^1(n) + y_{envelope\ curve}^2(n) \tag{9}$$

where these two summands correspond to the two summands in the envelope curve formula of equation (1).

Figure 2:
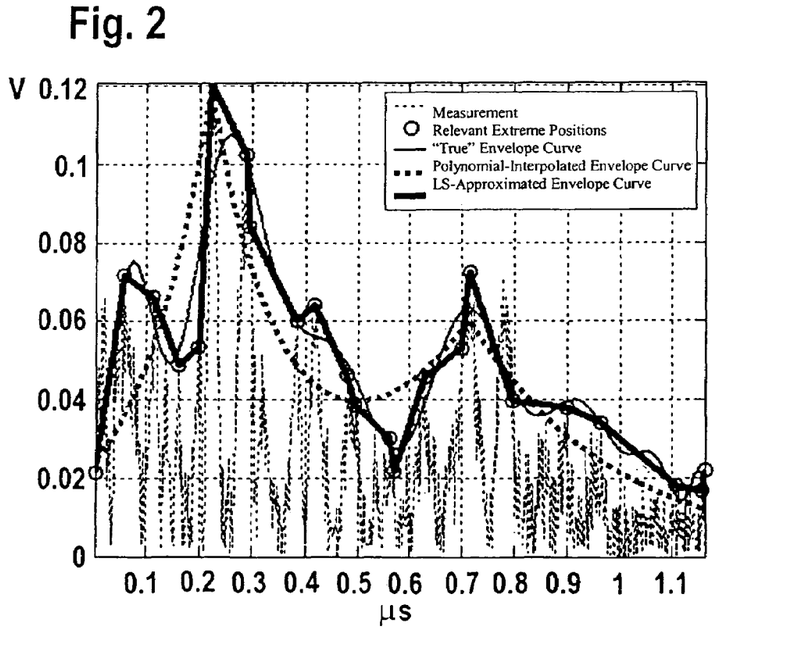
FIG. 2 shows an envelope curve estimated by the least squares estimation method.

The result of the least squares estimate of the envelope curve using the exponential functions according to equation (9) is illustrated in FIG. 2.

A good least squares approximation of the envelope curve may be obtained in the manner described, which is essential for the quality of the pulse defining parameters derived therefrom.

Quality Criteria for Pulse Selection

Since suitable methods for synthesizing short-term pulse interferers have been found with equations (1) and (2), the task is to extensively automate the derivation of suitable parameter sets for these equations from the already empirically obtained measured data. Each interfering pulse may be approximated 42× using 32× the short-time Fourier transformation having eight different window functions and four different time window lengths, 4× the autoregressive AR model having orders 50, 100, 150, 200 and 6× the Wigner-Ville transformation having the particular six different distributions. A suitable decision criterion for the results of the various time frequency analysis methods is used to select the best approximating parameter set.

Determination of how good an approximation is, i.e., how well the interfering pulse represented by the approximating parameter data record represents an originally measured interfering pulse is accomplished most easily by visual inspection, i.e., by superimposing the two pulses. However, cross-correlation coefficient r between the originally empirically determined, i.e., measured, interference pulses and the interfering pulses approximated according to the exemplary embodiment and/or exemplary method of the present invention, i.e., represented by their approximating parameter sets, is used for an automated sequence for deriving suitable parameter sets.

Calculation of the cross-correlation coefficient is essentially known. It is defined as covariance function $V_{xy}$ standardized to standard deviations $\sigma_x$ and $\sigma_y$, where x represents the empirically determined, i.e., measured, interfering pulses and y represents the approximated interfering pulses. Cross-correlation coefficient r is thus calculated according to the following equation:

$$r_{xy} = \frac{V_{xy}}{\sigma_x \cdot \sigma_y} \quad (10)$$

where $r_{xy} \leq \pm 1$. A value $r_{xy} = \pm 1$ is obtained when there is a rigid link between the measured pulses and the approximated pulses. However, if an approximated pulse is very poorly adjusted to the measured pulse to be approximated by it, the cross-correlation coefficient is then r=0.

Figure 3A:
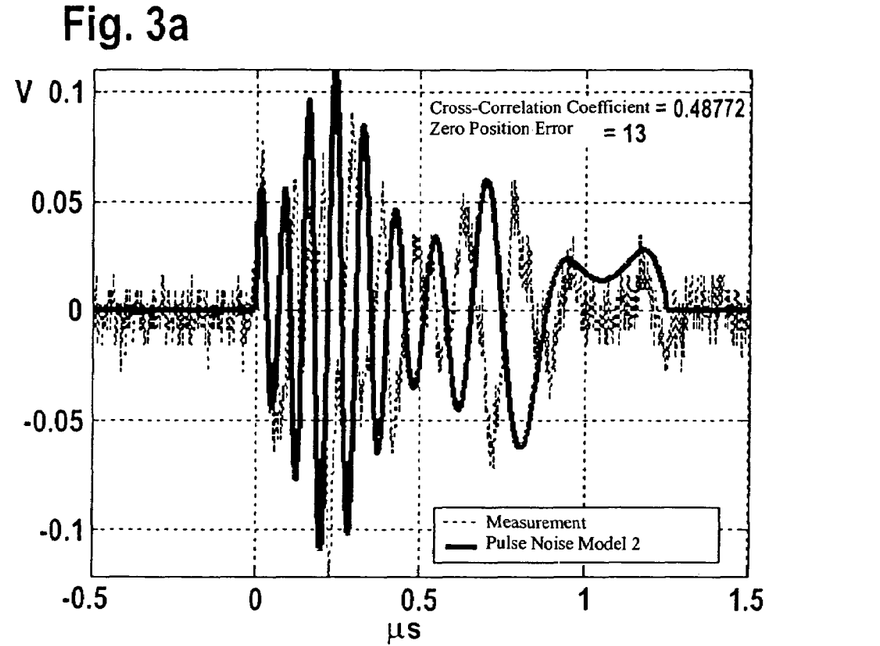
FIG. 3a shows a first example of an approximated interfering pulse in comparison with the particular interfering pulse, originally determined empirically.
Figure 3B:
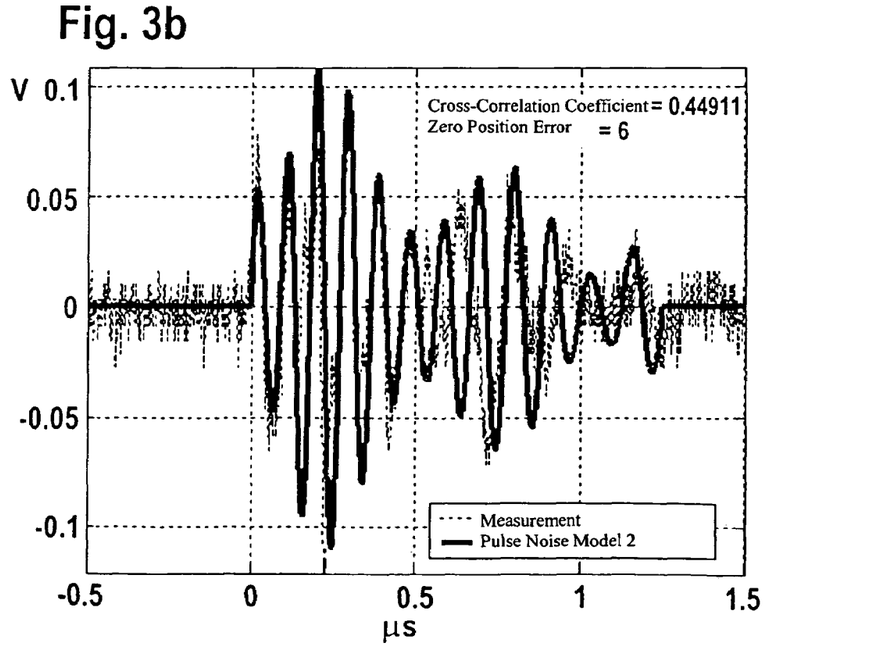
FIG. 3b shows a second example of an approximated interfering pulse in comparison with a particular interfering pulse originally determined empirically.

The fact that the cross-correlation coefficient itself does not yield any irrefutable conclusion regarding the quality of the simulation, i.e., an approximation of the measured interfering pulse by the interfering pulses approximating it, is illustrated on the basis of FIGS. 3a and 3b. A visual comparison of the approximations illustrated in the two figures shows immediately that the approximation shown in FIG. 3b is better, although cross-correlation coefficient r as the only criterion of the approximation shown in FIG. 3a would be better testimony.

Therefore, in addition to the cross-correlation coefficient, another decision criterion for selection of the most suitable approximating parameter set is the method of zero position error control. In combination with the cross-correlation coefficient, this permits a binding statement regarding the optimum approximating parameter set.

Zero Position Error Control

Figure 4:
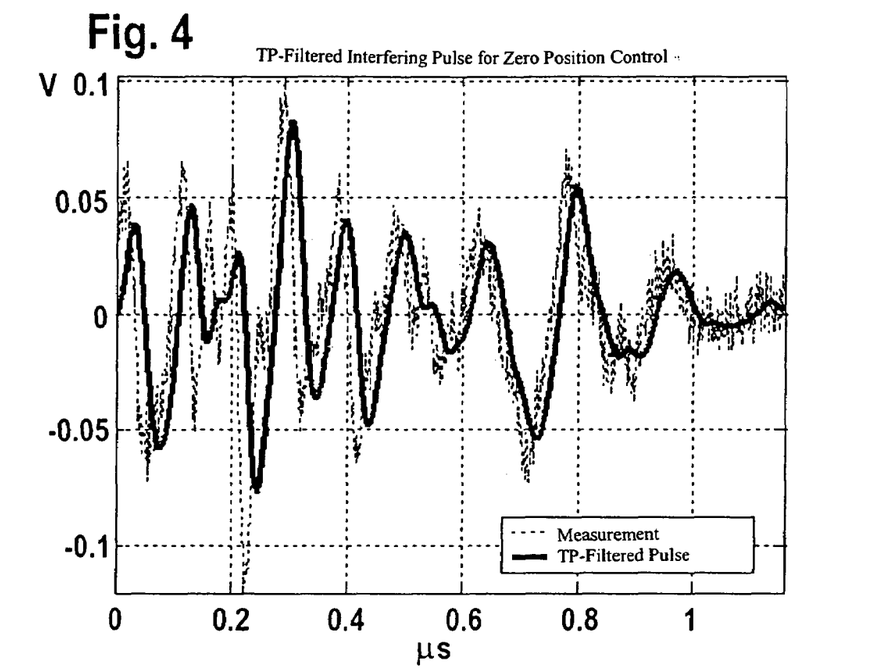
FIG. 4 shows a low-pass-filtered interfering pulse for determination of the zero crossing.

To determine the zero crossings of the measured interfering pulse, first the noise must be filtered out of the measurement. The cutoff frequency of the low-pass filtering required for this must be kept variable because otherwise the curve of the measured pulse would be distorted too much. In contrast to low-pass filtering for determining the true envelope curve, filtering must be performed much more accurately here because otherwise an erroneous frequency would be deduced under some circumstances. For determining the maximum signal frequency, the AR model may be used. This may be (probably is) the best method in terms of quality versus computation time. FIG. 4 shows as an example a low-pass-filtered empirically determined measured interfering pulse on the basis of which the method of zero crossings is explained briefly below.

Figure 5:
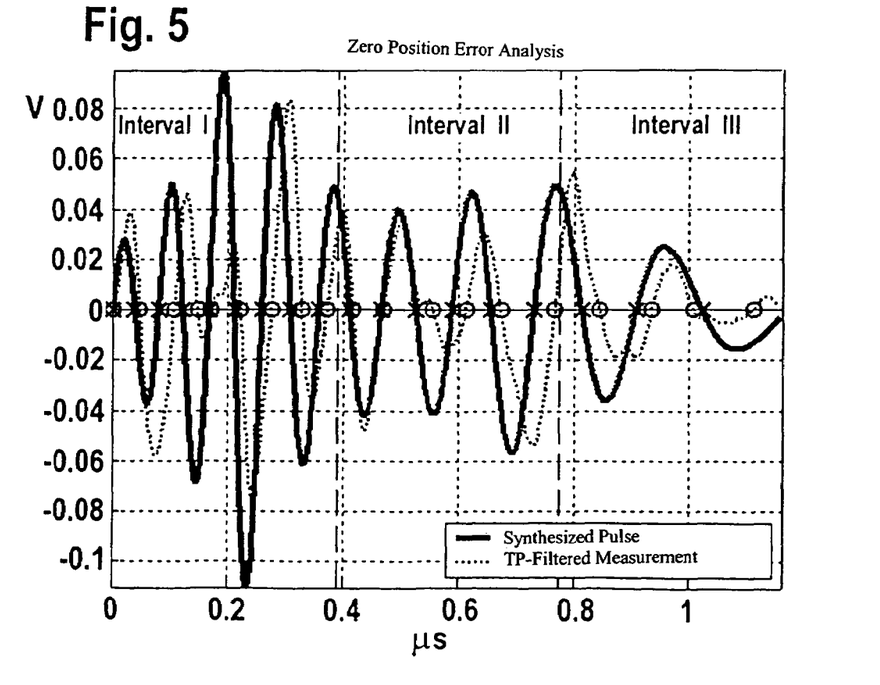
FIG. 5 shows the division of an interfering pulse into individual partial ranges for optimization of a zero position error analysis.
Figure 6A:
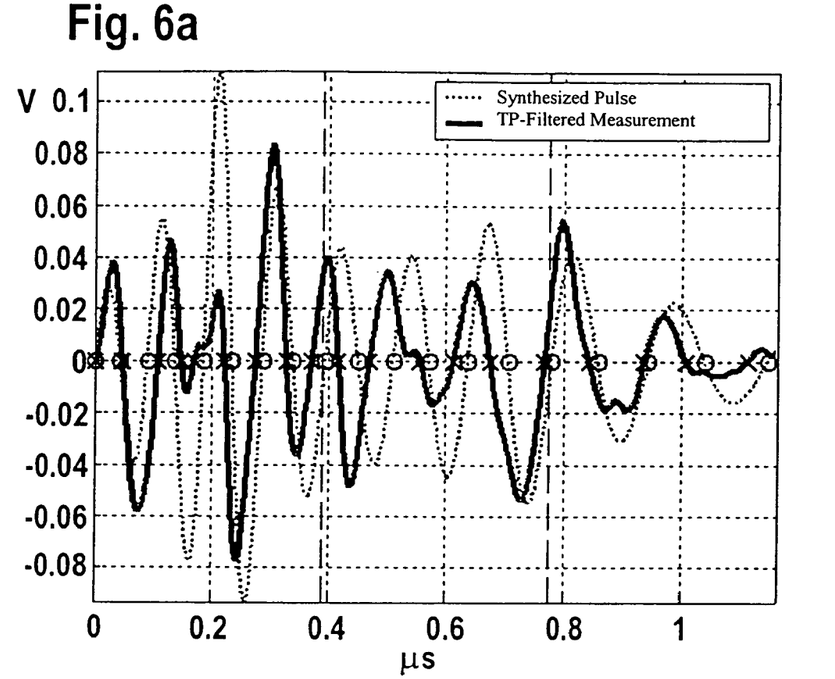
FIG. 6a shows a first example of a position correction of the limit of a partial range as part of the zero position error analysis.
Figure 6B:
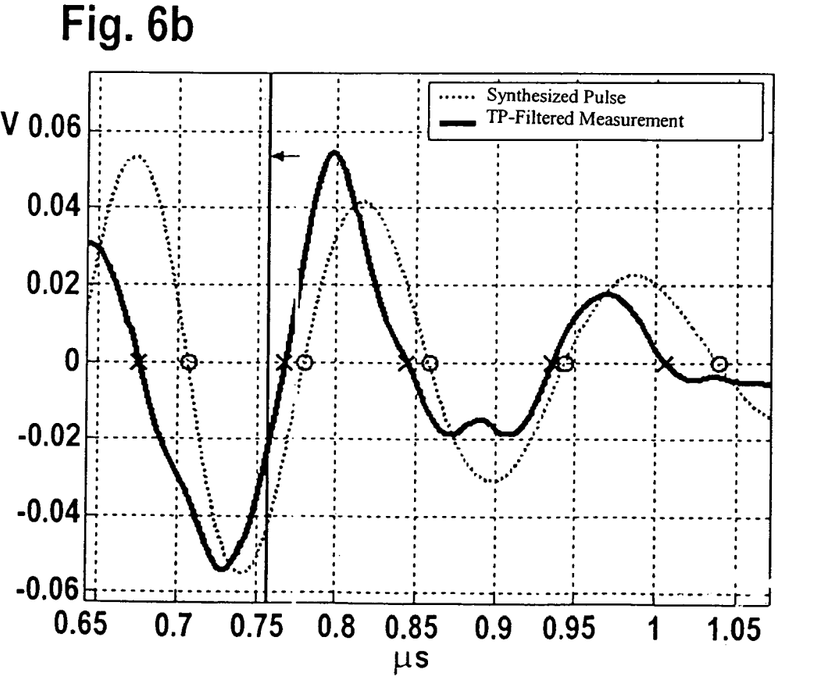
FIG. 6b shows a second example of a position correction of the limits of the partial areas for the zero position error correction.

Previous attempts have been aimed at using the maximum frequency of the particular approximated pulse as the valid cutoff frequency. However, this could result in very low frequency approximations suddenly being interpreted as correct because they smooth over the true pulse due to the low cutoff frequency. As shown by a visual comparison of the interfering pulses illustrated in FIG. 4, an absolute zero position error control must not be performed. Therefore, the curve of the interfering pulse is subdivided into three time intervals. The relative zero position error is determined in each of the intervals, which may be three intervals. This is illustrated in FIG. 5. The zero crossings detected in the individual intervals are marked with an "x" there. Only the last zero position of the measurement recording at 1.1 µs does not have a counterpart in the approximating pulse. The dividing of the curve of the pulse into time intervals, which may be three time intervals, may result in problems as illustrated on the basis of the results of a performed short-time Fourier transformation approximation (see FIGS. 6a and 6b). A query is performed to check whether two zero positions that belong together, i.e., one true zero position and one approximating zero position, have been divided by the interval limits. If this is the case, the corresponding zero position is assigned to the other interval. This assignment is accomplished by a shift in the interval limit, as illustrated in FIG. 6b.

Since the data records are very extensive anyway and must be reduced for a computation-intensive statistical analysis, it is advisable to set very strict decision criteria. For example, it is advisable to require at least a correlation coefficient of 0.2 for a valid approximation and at the same time to require a zero position error of max. 0.25 for the relative zero position error, i.e., based on the total number of zero positions. By using the various suitable decision criteria, it is possible to select, from the plurality of available approximating parameter sets for a previously determined interfering pulse, that parameter set which best approximates this empirically determined measured interfering pulse. By substituting this most suitable parameter set into the particular mathematical function according to equation (1) or (2), an approximating interfering pulse may be formed for the empirically determined interfering pulse. However, this approximating interfering pulse is not yet identical to the modeled interfering pulse sought by the exemplary method according to the present invention. This requires a few subsequently described processing steps of the obtained parameter data record with the best approximation.

Determination of the Density Functions

Following the above-described considerations, which are necessary for obtaining the best approximating parameter data record from the previously empirically determined measurement database, the corresponding density functions of the parameters are to be estimated for subsequent modeling according to the exemplary embodiment and/or exemplary method of the present invention.

Figure 7A:
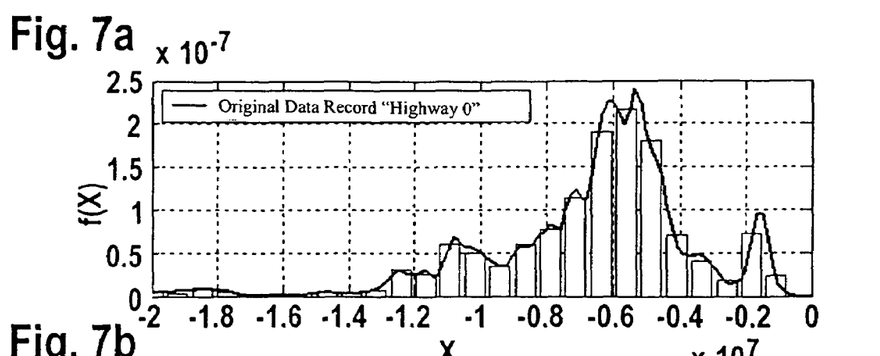
FIG. 7a shows the density function, i.e., histogram, of a pulse start frequency of an initially determined parameter data record.
Figure 7B:
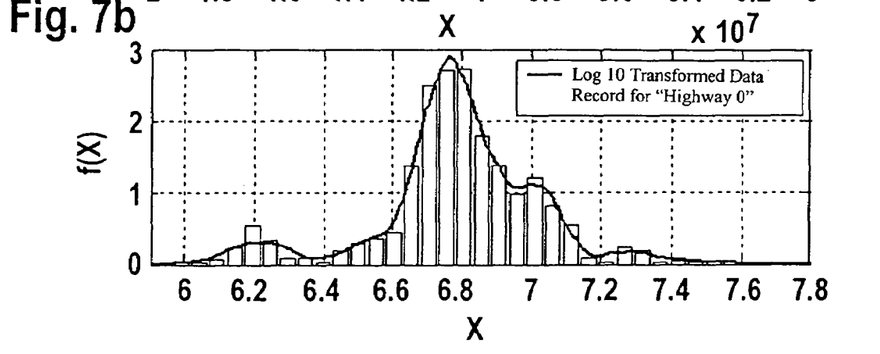
FIG. 7b shows a display of the same density function, i.e., the same histogram, of the parameter data record after a log 10 transformation.

As numerous examinations have shown and as was also to be expected from a theoretical standpoint, the known core estimator is a universal method for determining the density functions of any type of distribution. The deciding factor here is the choice of the bandwidth on which the investigations are based. If the value range of the database to be investigated is very large, it is very difficult to select an optimum bandwidth. For this reason, a transformation to a value range suitable for modeling is advisable. This may be in a range in which the determined values are in a very dense value range. An example of this transformation is shown in FIGS. 7a and 7b. FIG. 7a shows the density function, i.e., the histogram, of the pulse start frequency of an originally determined measured data record. It should be noted here that the value quantity extends over several powers of ten. In contrast, FIG. 7b shows the density function, i.e., the histogram, of the data record after its transformation, or more precisely, after a log 10 transformation. The value range was represented by the transformation essentially in a range between 6 and 7.5.

It is also apparent from a comparison of FIGS. 7a and 7b that the course has been smoothed by the transformation which indicates that the bandwidth has been adjusted better to the measured data record without deleting any significant features of the original measurement database. However, the interaction between the bandwidth and the measured values, e.g., lambda values lambda(i), as variable bandwidth parameters is also important. The goal of the exemplary method according to the present invention is to determine the modeled interfering pulse by random determination of the parameters of a parameter set representing the modeled interfering pulse on the basis of the density functions belonging to the parameters. This is done according to the preceding embodiments using the following equation:

$$y = \text{data}(i) + \text{lambda}(i) \cdot h_{opt} \cdot W \quad (11)$$

Figure 8:
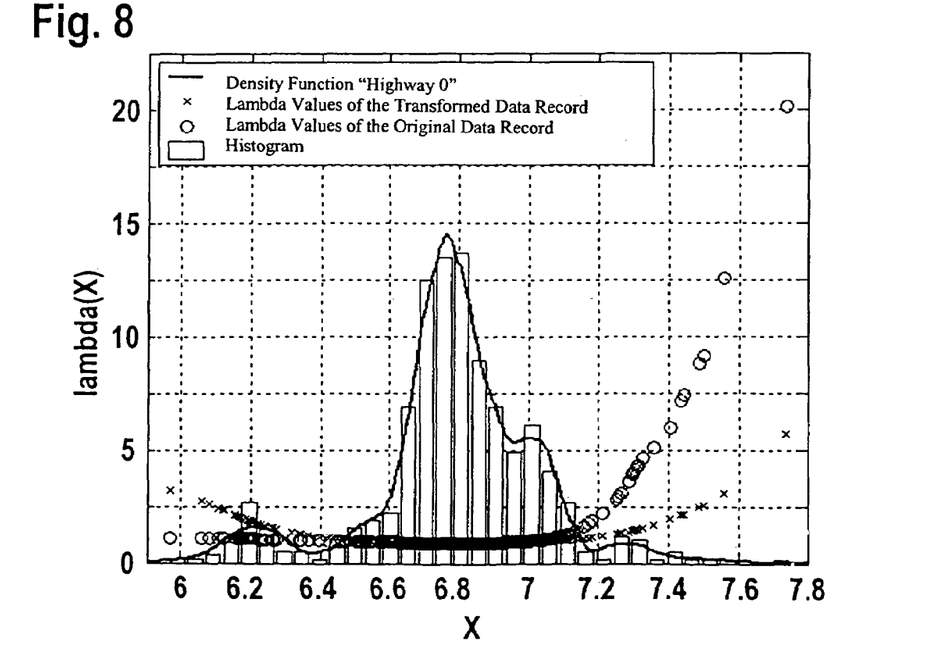
FIG. 8 shows a comparison of lambda values according to the originally determined parameter data record and the transformed parameter data record.

For the random determination of parameter y, a value data (i) is selected from the empirically determined measured data according to equation (11) and is provided with an additive term representing the density function. In this additive term, factor W denotes a random variable having an Epanechnikov distribution and has a value from the quantity $\{-1 \ldots 1\}$. Factor $h_{opt}$ is the continuously determined optimum bandwidth according to which the lambda values lambda(i) are calculated. These lambda values lambda(i) are shown in FIG. 8 as an example and are shown for the transformed measurement data record as well as for the untransformed original measurement data record for comparison purposes as a function of the transformed measurement data record.

From the factors presented so far, a transformation using the core estimator in the one-dimensional case is of no relevance. On the basis of the advantages described above, a log 10 transformation is performed before the parameter estimation for exponential coefficients $c_1$ and $c_2$ according to equation (1), which extend over a very large value range.

If two-dimensional density functions are investigated, a transformation of the original measurement data record proves to be indispensable, but only if the value ranges differ greatly. For example, if the dependence between an exponential coefficient in the value range or approximately $10^6$ and the pulse period in the value range of approximately $10^{-6}$ are considered, the problem becomes clear very quickly. First, an optimum bandwidth is again identified using an optimization algorithm. A lambda value is then assigned to each data record pair i according to the bandwidth. If the data records are very far apart in order of magnitude and/or if there is the additional problem that they are dispersed over a wide range, the lambda values may no longer be optimally adjusted because a value must be valid for the original measured data record as well as for the approximating parameter set.

Figure 9A:
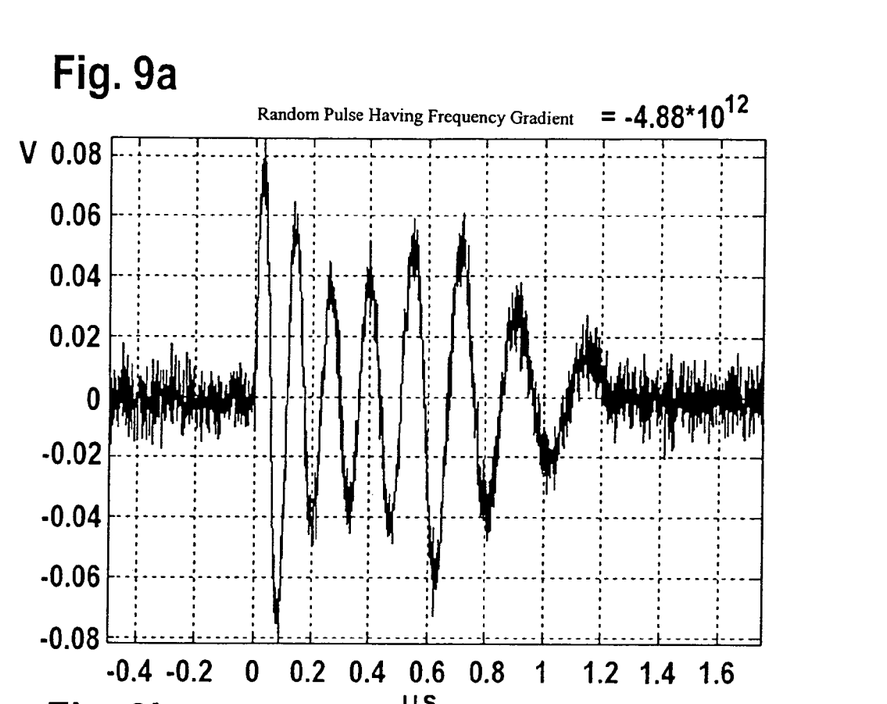
FIG. 9a shows a generated pulse with adjustment of the pulse period and gradient.
Figure 9B:
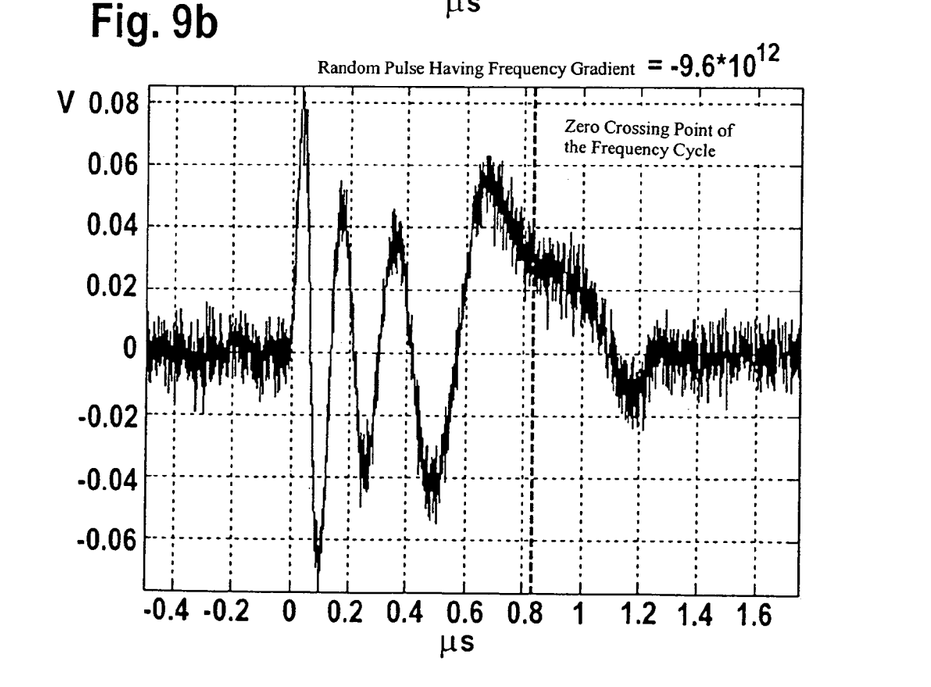
FIG. 9b shows a generated pulse without adjustment of the pulse period and gradient.

Another problem in random generation of pulses arises from the two-dimensional core estimate for the parameters that determine the frequency vector. In original application 2, a linear change in frequency was regarded as suitable for the synthesis of a pulse. Consequently, the frequency must be determined at time t=0 (called the starting frequency), and the slope of the linear change in frequency (called the frequency gradient) must also be determined. It is self-evident that these two parameters must be considered in mutual dependence. However, all other parameters of pulse approximation are considered to be statistically independent. One reason for this is that in the estimated simulation, the variety of generated pulses is as broad as possible, but secondly there are also reasons involving the question of implementation. The optimization algorithms for determining an optimum bandwidth may be implemented only maximally for dimensions of the third order with a justifiable expense. To illustrate these problems, one example shall be considered. FIGS. 9a and 9b show pulse curves including the particular pulse period which were approximated from an identical measurement data record. The pulse curves in FIGS. 9a and 9b were generated with identical envelope curve parameters but with different frequency gradients.

The gradients in the two figures were likewise obtained from the same measurement data record. Due to the lack of adjustment of the pulse period and the frequency gradient in the case of the pulse shown in FIG. 9b, there is a zero crossing of the linearly approximated frequency vector which results in distortion within the curve of the modeled pulse due to the resulting negative frequencies. For this reason an alternative to suppressing the above-described effects has been sought. Instead of statistical analysis of the starting frequency and the frequency gradient, a start frequency and an end frequency (frequency at the time of the end of the pulse) should be predetermined as in the case of a chirp signal. In practical implementation, the start frequency and the end frequency are obtained from a two-dimensional density function and the pulse period is also generated from which the gradient may be consequently calculated.

Figure 10A:
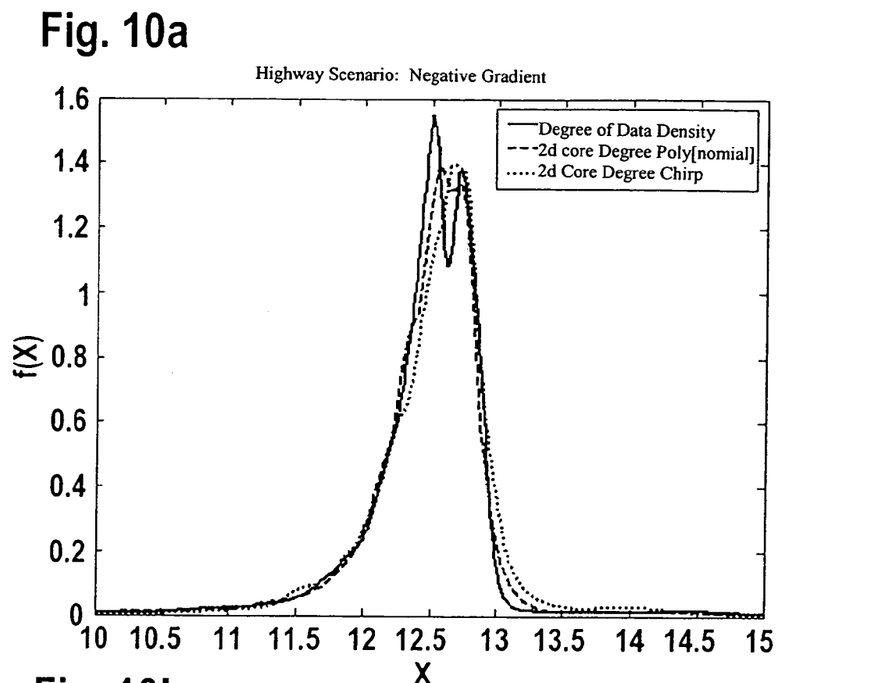
FIG. 10a shows density functions for negative gradients determined in various ways.
Figure 10B:
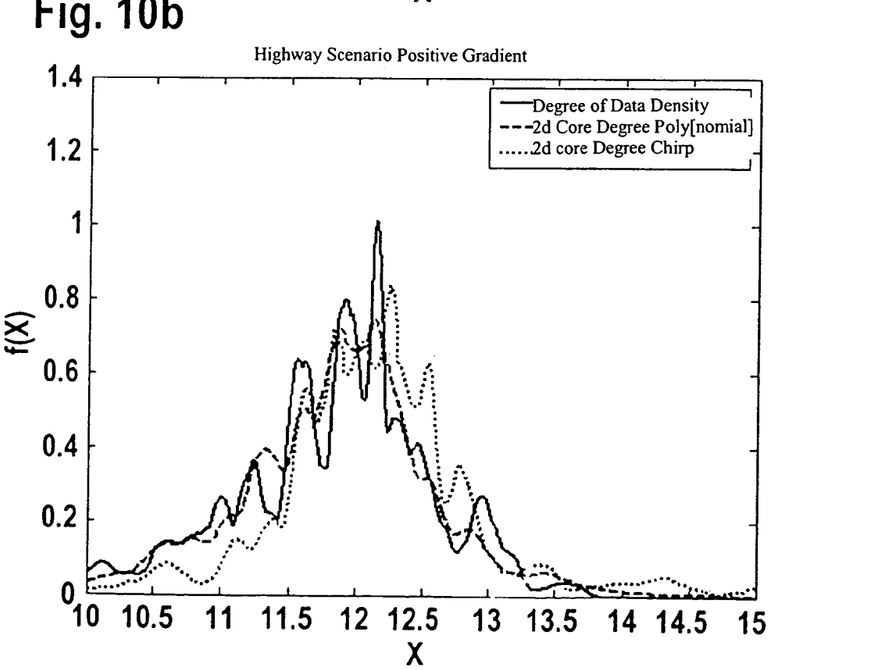
FIG. 10b shows density functions for positive gradients determined in various ways.

It was thus necessary to investigate whether the gradients of the randomly generated modeled pulses would deviate significantly from the previously determined approximating pulses due to the procedure described here. Therefore, FIGS. 10a and 10b show density functions calculated from the analytically determined gradients and density functions calculated using the core estimator in one case directly and in another case based on the start frequency, the end frequency and the pulse period. The graphic comparison in FIGS. 10a and 10b shows that the assumption made above is justified because the gradients do not differ significantly. Application of this method for determining frequency vector f(t) is thus justified. A log 10 transformation before the parameter estimate is thus also advisable for the pulse start frequency and end frequency used here because like the exponential coefficients, the log 10 transformation is scattered over a very large range of values.

Modeling

When using the mathematical function according to equation (1), suitable density functions are estimated for envelope curve parameters $A_1, A_2, c_1, c_2, t_1, t_2$ contained therein and also for pulse start frequency f(0) and pulse transmission frequency $f(T_{pulse})$ from an extensive measurement database. $T_{pulse}$ is thus determined for the pulse period for which a density function is also determined. The measurement database was determined using extensive test runs. To obtain better estimation results, a log 10 transformation was performed for exponential coefficients $c_1$ and $c_2$ as well as the pulse start frequency and pulse transmission frequency. A pulse which simulates one of the previously empirically determined, i.e., measured, interfering pulses is formed randomly from these density functions.

Figure 11:
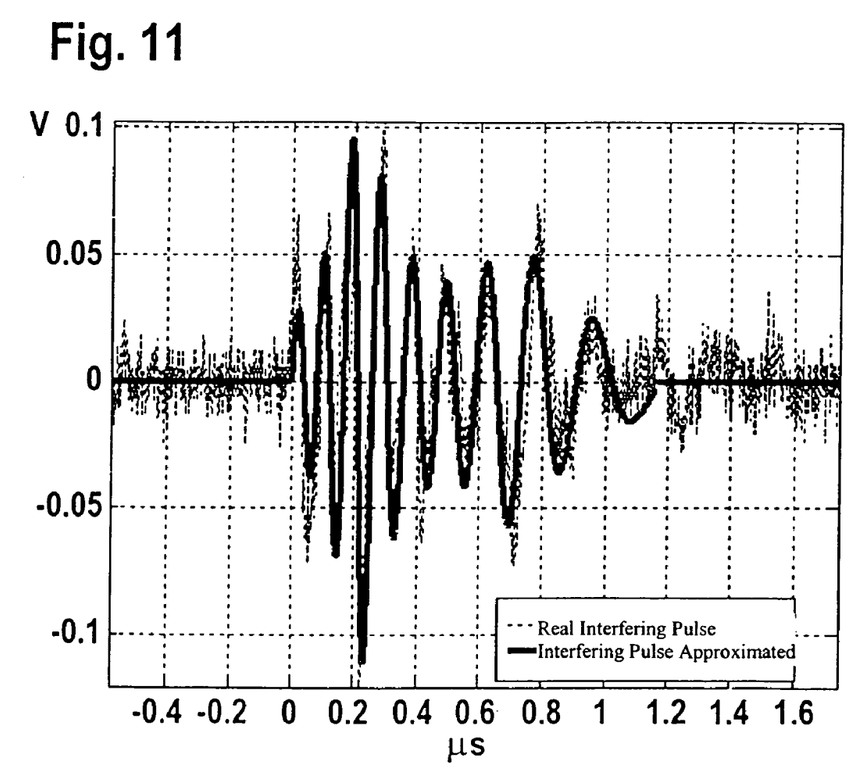
FIG. 11 shows a comparison of a real interfering pulse and an interfering pulse approximated by the method according to the exemplary embodiment and/or exemplary method of the present invention.

FIG. 11 shows a comparison of a real interfering pulse with one approximated according to the exemplary embodiment and/or exemplary method of the present invention.

On the basis of the individual interfering pulses modeled in this way, a complete pulse interferer pattern may be simulated which includes a plurality of such interfering pulses individually set apart from one another. For this purpose, the duration of this pulse interferer pattern is first determined and the pulse interval belonging to a first modeled interfering pulse is determined. Successive modeling of additional interfering pulses and their particular individual pulse intervals is then performed until the previously determined pulse interferer pattern duration has been reached. Both the individual pulse intervals and the pulse interferer pattern duration are determined by statistical analysis of an empirically determined plurality of suitable density functions derived from pulse interferer patterns. The pulse interval describes the distance between the pulse starting points of two adjacent pulses within a pulse pattern. A pulse pattern is a random sequence of pulses triggered by the switching of an automotive component or by the occurrence of an engine ignition pulse. The pulse pattern duration indicates the length of a pulse pattern and may be used to deduce the number of pulses in the pulse pattern.

Many pulse interferer patterns with individual intervals between them together form a pulse interferer scenario. A pulse interferer scenario may also be modeled starting from an interfering pulse modeled according to the exemplary embodiment and/or exemplary method of the present invention. Under the assumption that engine ignitions are by far the most common triggering event for interfering pulses in vehicle electric systems, the interval in time between such ignitions is used for the determination of the pulse pattern interval, i.e., the distance between two adjacent pulse interferer patterns. Thus the model of a pulse interferer pattern and/or a pulse interferer scenario depends on the engine speed.

The interference model presented here may be implemented using the known simulation software SIMULINK, for example. It is then available for simulation purposes. A simulation may be performed under realistic conditions either using the blocks made available by SIMULINK or using self-designed blocks. An interference scenario may be held not only as a function of a driving scenario, i.e., depending on the driving situation, e.g., highway, country road or city, but also as mentioned above, as a function of a freely selectable speed curve. The underlying channel characteristic may also be incorporated via an additional value data file with which the complete transmission system is able to be simulated including all relevant parameters.

What is claimed is:

1. A method for modeling an interfering pulse in a vehicle electric system used at least one of for supplying power to various automotive components and for transmitting data between components, at least some of the components generating interfering pulses in the vehicle electric system during their operation, the method including:

empirically determining a plurality of interfering pulses;

simulating the individual previously determined interfering pulses via a mathematical function using a suitable parameter set, each parameter set containing a plurality of different parameters;

transforming individual parameters in all parameter sets into a value range suitable for modeling;

determining a density function for each transformed and non-transformed parameter via the plurality of its implementations contained in the parameter sets; and modeling the interfering pulse by random determination of the parameters of a parameter set representing the interfering pulse to be modeled based on the density functions belonging to the parameters and by substituting the parameters thus obtained into the mathematical function.

2. The method of claim 1, wherein the mathematical function is as follows:

$$y_{LS}(t) = (A_1 \cdot \exp(-c_1|t-t_1|) + A_2 \cdot \exp(-c_2|t-t_2|)) \cdot \sin(2\pi \cdot f(t) \cdot t) \quad (1)$$

having parameters $A_1$, $A_2$, $c_1$, $c_2$, $t_1$, $t_2$, hereinafter also referred to as the first envelope curve parameters, and time-dependent parameter $f(t)$ representing a time-dependent frequency vector.

3. The method of claim 2, wherein the determination of the first or second envelope curve parameters of the suitable parameter set as part of the simulation of each individual interfering pulse includes:

providing a varied approximation of each individual previously empirically determined interfering pulse, each in the form of a plurality of approximating parameter sets; and selecting a most suitable parameter set in the form of the best approximating parameter set via a decision criterion.

4. The method of claim 3, wherein the empirically determined interfering pulse is approximated as part of the varied approximation 42×, 32× via the short-time Fourier transformation having eight different window functions and four different time window lengths, 4× via the autoregressive AR model having the orders 50, 100, 150 and 200, and 6× via the Wigner-Ville transformation having six different distributions.

5. The method of claim 3, wherein:

the most suitable and optimized parameter set for simulating the previously empirically determined interfering pulse is selected accordingly using at least one selected cross-correlation coefficient as a decision criterion, the selected cross-correlation coefficient is selected from a plurality of cross-correlation coefficients formed between the empirically determined interfering pulse and interfering pulses approximating it, and each approximating interfering pulse is represented by one of the approximating parameter sets.

6. The method of claim 5, wherein the cross-correlation coefficient having the greatest value is selected as the decision criterion, and the approximating parameter set assigned to this cross-correlation coefficient is selected as the optimized parameter set.

7. The method of claim 5, further comprising:

preselecting "n" correlation coefficients having the "n" largest values from the plurality of formed correlation coefficients, each of the "n" correlation coefficients representing an approximating parameter set and thus representing an approximating interfering pulse; and selecting the most suitable parameter set in the form of the one form the "n" preselected approximating parameter sets whose associated approximating interfering pulse which has the same number of zero crossings as the previously empirically determined interfering pulse to be simulated.

8. The method of claim 7, wherein performing the comparison of the number of zero crossings includes:

subdividing the empirically determined interfering pulse and the interfering pulse approximating it into individual partial ranges;

optimizing limits of the partial ranges with respect to a zero position error control to be performed subsequently;

performing the comparison for each individual partial range; and subsequently forming the relative zero position error.

9. The method of claim 2, wherein the frequency-independent envelope curve parameter is determined using a least squares estimate.

10. The method of claim 1, wherein the mathematical function is as follows:

$$Y_{Poly}(t) = (a_8 t^8 + a_7 t^7 + a_6 t^6 + a_5 t^5 + a_4 t^4 + a_3 t^3 + a_2 t^2 + a_1 t + a_0) \cdot \sin(2\pi \cdot f(t) \cdot t) \quad (2)$$

having parameters $a_0$ through $a_8$, hereinafter also referred to as the second envelope curve parameters, and time-dependent parameter $f(t)$ representing a time-dependent frequency vector.

11. The method of claim 10, wherein the frequency-independent envelope curve parameters are determined using polynomial interpolation.

12. The method of claim 1, further comprising:

modeling a pulse interferer pattern by executing the following steps:

determining a duration of the pulse interferer pattern;

determining a pulse interval assigned to the modeled interfering pulse; and successively modeling additional interfering pulses and determining pulse intervals assigned individually to these interfering pulses until the pulse interferer pattern duration has been reached.

13. The method of claim 12, wherein the pulse interferer pattern duration is determined by statistically analyzing a density function derived from an empirically determined plurality of pulse interferer patterns.

14. The method of claim 12, wherein the pulse intervals are determined by statistically analyzing a density function derived from an empirically determined plurality of pulse interferer patterns.

15. The method of claim 12, wherein a pulse interferer scenario is modeled from a plurality of modeled pulse interferer patterns and pulse interferer pattern intervals individually assigned to these pulse interferer patterns.

16. A computer readable medium encoded with a computer program executable on a processor, the computer program comprising:

computer program code for modeling an interfering pulse in a vehicle electric system used at least one of for supplying power to various automotive components and for transmitting data between components, at least some of the components generating interfering pulses in the vehicle electric system during their operation, by performing the following:

empirically determining a plurality of interfering pulses;

simulating the individual previously determined interfering pulses via a mathematical function using a suitable parameter set, each parameter set containing a plurality of different parameters;

transforming individual parameters in all parameter sets into a value range suitable for modeling;

determining a density function for each transformed and non-transformed parameter via the plurality of its implementations contained in the parameter sets; and modeling the interfering pulse by random determination of the parameters of a parameter set representing the interfering pulse to be modeled based on the density functions belonging to the parameters and by substituting the parameters.

17. A computer readable medium comprising:

a computer program executable on a processor, the computer program including:

computer program code for modeling an interfering pulse in a vehicle electric system used at least one of for supplying power to various automotive components and for transmitting data between components, at least some of the components generating interfering pulses in the vehicle electric system during their operation, by performing the following:

empirically determining a plurality of interfering pulses;

simulating the individual previously determined interfering pulses via a mathematical function using a suitable parameter set, each parameter set containing a plurality of different parameters;

transforming individual parameters in all parameter sets into a value range suitable for modeling;

determining a density function for each transformed and non-transformed parameter via the plurality of its implementations contained in the parameter sets; and modeling the interfering pulse by random determination of the parameters of a parameter set representing the interfering pulse to be modeled based on the density functions belonging to the parameters and by substituting the parameters.

* * * * *